United States Patent [19]

Jacobson et al.

[11] Patent Number: 5,583,410
[45] Date of Patent: Dec. 10, 1996

[54] METHOD AND APPARATUS FOR MULTIPLEX CONTROL OF A PLURALITY OF STEPPER MOTORS

[75] Inventors: Gary S. Jacobson, East Norwalk; Wesley A. Kirschner; Michael J. Ramadei, both of Trumbull, all of Conn.

[73] Assignee: Pitney Bowes Inc., Stamford, Conn.

[21] Appl. No.: 326,980

[22] Filed: Oct. 21, 1994

[51] Int. Cl.$^6$ .................................................. G05B 19/40
[52] U.S. Cl. ........................ 318/696; 318/625; 318/810
[58] Field of Search ........................................ 318/606, 607, 318/615, 625, 685, 896, 807, 810

[56] References Cited

U.S. PATENT DOCUMENTS

| | | | |
|---|---|---|---|
| 4,258,622 | 3/1981 | Estrabaud et al. | 101/93.01 |
| 4,356,439 | 10/1982 | Mott et al. | 318/685 |
| 4,691,154 | 9/1987 | Sato et al. | 318/696 |
| 4,703,244 | 10/1987 | Takeuchi et al. | 318/696 |
| 4,833,593 | 5/1989 | Takeuchi et al. | 318/696 X |
| 4,858,103 | 8/1989 | Takeuchi et al. | 318/696 X |
| 4,869,610 | 9/1989 | Nishizawa et al. | 318/685 X |
| 4,918,365 | 4/1990 | Tanuma et al. | 318/685 |
| 4,980,846 | 12/1990 | Chapman | 364/550 |
| 5,032,780 | 7/1991 | Hopkins | 318/696 |
| 5,200,683 | 4/1993 | Taylor et al. | 318/661 |
| 5,260,630 | 11/1993 | Iwagaya et al. | 318/625 X |
| 5,291,114 | 3/1994 | Shirotori et al. | 318/685 |

*Primary Examiner*—Brian Sireus
*Attorney, Agent, or Firm*—Robert H. Whisker; Melvin J. Scolnick

[57] ABSTRACT

A plurality of step time tables consisting of a sequence of step times defining intervals between steps and thus a velocity profile to be executed by a stepper motor are stored in a first memory. A step table defining a plurality of identical sequences of excitation pattern for driving a stepper motor is stored in a second table. Identical DMA channels output the step times to a timer and the plurality of exitation patterns to a buffer. The timer measures the duration of the step times and when each step time expires generates a trigger signal which initiates the transfer of the next step time and next excitation pattern through the respective DMA channels. The buffer includes a control register which selects one excitation pattern from the plurality of excitation patterns output from the step table to be output for control of a selected one of a plurality of motors connected to the buffer. The buffer outputs are inverted to form bipolar signals to drive current drivers in accordance with the excitation pattern. The apparatus is initialized by a data processor to select one of the plurality of excitation tables and to select one of the groups of outputs of the buffer to drive a corresponding selected motor. The DMA channel for outputting the step time table is initialized for non-repetitive operation and the DMA channel outputting the step table is initialized for cyclic operation. The direction in which the selected stepper motor is to be driven is determined by the direction in which the step table is accessed.

13 Claims, 3 Drawing Sheets

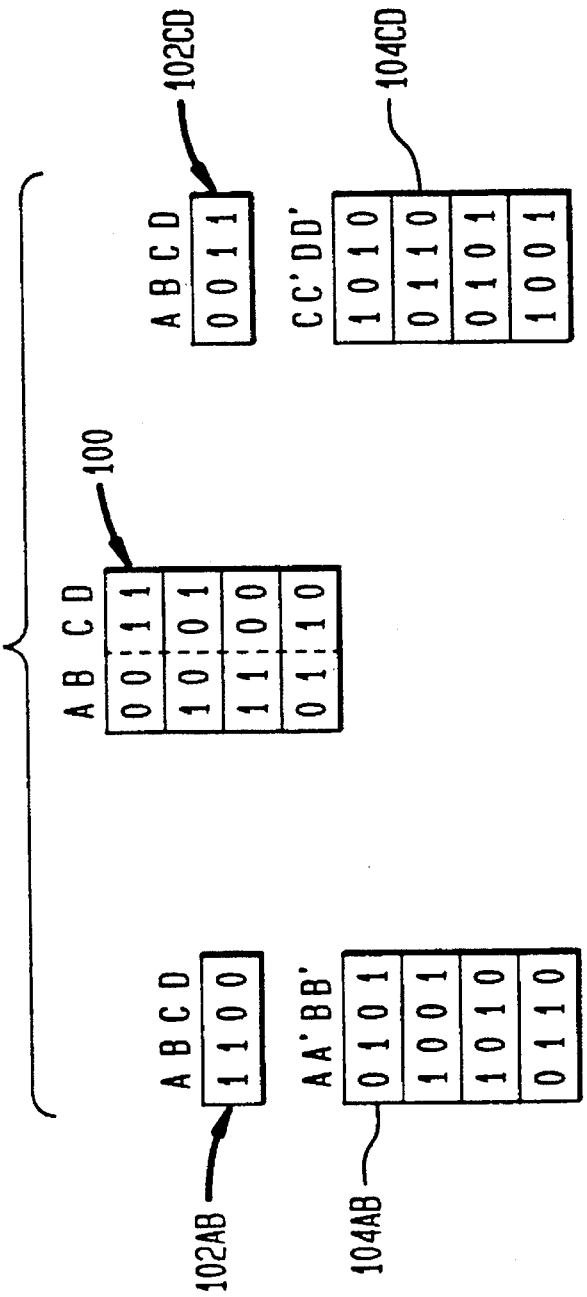

METHOD AND APPARATUS FOR MULTIPLEX CONTROL OF A PLURALITY OF STEPPER MOTORS

BACKGROUND OF THE INVENTION

The subject invention relates to a method and apparatus for control of a stepper motor. More particularly, it relates to a method and apparatus for multiplexed control of a plurality of stepper motors by a data processor through direct memory access channels (hereinafter DMA channels).

The present application is related to, and shares, common elements of disclosure with, commonly assigned application Ser. No. 08/327,249 (E-257) filed on even date herewith.

Stepper motors are well known in the art and typically comprise motors having a pair of coils each of which may be excited independently in either one of two polarities. By applying an appropriate cyclic sequence of exitation patterns to a stepper motor the motor may be controlled to rotate in predetermined angular increments, or "steps".

By proper selection of the appropriate cyclic sequence of exitation patterns (hereinafter referred to as a "step table") a stepper motor may be operated in one of a plurality of modes of operation. These modes include a full-step mode where one of the two motor coils changes polarity at each step repeating the sequence exitation patterns through a four step step table, and a half-step mode wherein one or the other of the two motor coils is selectively de-energized at various steps of an eight step table to rotate the stepper motor in half steps. Other modes of operation of stepper motors are known, but need not be discussed further here for an understanding of the subject invention.

Stepper motors have proven very popular in modern, sophisticated mechanical equipment since, by varying the time between steps in a step table, a stepper motor may be driven through very flexible and highly precise velocity profiles necessary to implement complex mechanical functions such as those carried out by paper handling equipment. To achieve this flexibility in sophisticated applications it has generally been the case that a stepper motor would be controlled by a data processor such as a microprocessor. However, direct program control of a stepper motor by a data processor is a computationally intensive task which will consume an unacceptably large portion of the computational capabilities of a data processor, particularly of a microprocessor.

In the above referenced co-pending application one solution to this problem is provided through the use of DMA channels to control stepper motors. In this application, however, the number of ports for DMA access to the stepper motor limits the number of motors which can be controlled through DMA channels.

Accordingly, it is an object of the subject invention to provide a method and apparatus which will reduce the computational burden on a data processor controlling a stepper motor while still allowing flexible control of the stepper motor, and where the number of stepper motors which may be controlled is not limited to the number of ports for providing DMA access.

BRIEF SUMMARY OF THE INVENTION

The above object is achieved and the disadvantages of the prior art are overcome in accordance with the subject invention by means of a method and apparatus wherein a first memory is provided for storing a step time table which includes a sequence of step times defining a velocity profile for a stepper motor. (By "step time" herein is meant a numeric value which defines the interval between successive steps for a stepper motor in terms of a corresponding number of system clock pulses.) A first DMA channel accesses the first memory to output the sequence of step times, and a timer receives the step times from the first DMA channel and generates a sequence of trigger signals corresponding to expiration of the intervals defined by the step times. A second memory stores a step table defining a plurality of identical sequences of exitation patterns for driving a corresponding plurality of stepper motors and a second DMA channel accesses the step table to output a corresponding plurality of cyclic sequences of exitation patterns to drive the stepper motors. (By "identical sequences of exitation patterns" herein is meant sequences which are identical except for a possible phase difference).

A buffer comprising a plurality of groups of cells where each group temporarily stores an exitation pattern of a corresponding one of the stepper motors and an enabling request for storing data for enabling one of the groups corresponding to the selected motor, and disabling all other groups, is also provided.

In operation the first DMA channel responds to the trigger signals to output the sequence of step times until the sequence is complete and the second DMA channel is responsive to the trigger signals to output the cyclic sequences of exitation patterns. The timer is responsive to input of each of the step times to begin timing the duration of the interval defined by that step time, and the apparatus is responsive to a data processor to initiate execution of the acceleration profile defined in the step time table.

Those skilled in the art will recognize that while the subject invention has been described in terms of two memories these memories may be separate portions of a single memory device and will preferably be located in the same address space.

In accordance with one aspect of the subject invention the first memory stores a plurality of step time tables corresponding to plurality of velocity profiles and the first DMA channel responds to signals from a data processor to select one of the step time tables.

Thus, it can be seen that the subject invention achieves the above object and advantageously overcomes the disadvantages of the prior art. Other objects and advantageous of the subject invention will be apparent to those skilled in the art from consideration of the attached drawings and the detailed description set forth below.

BRIEF DESCRIPTION OF THE DRAWINGS

FIG. 2 shows representations of a step table consisting of two identical (except for a phase difference) cyclic sequences of exitation patterns for operation of a stepper motor selected from a pair of motors.

FIG. 3 shows a representation of a step time table in accordance with the subject invention.

DETAILED DESCRIPTION OF PREFERRED EMBODIMENTS OF THE INVENTION

Figure 1A:
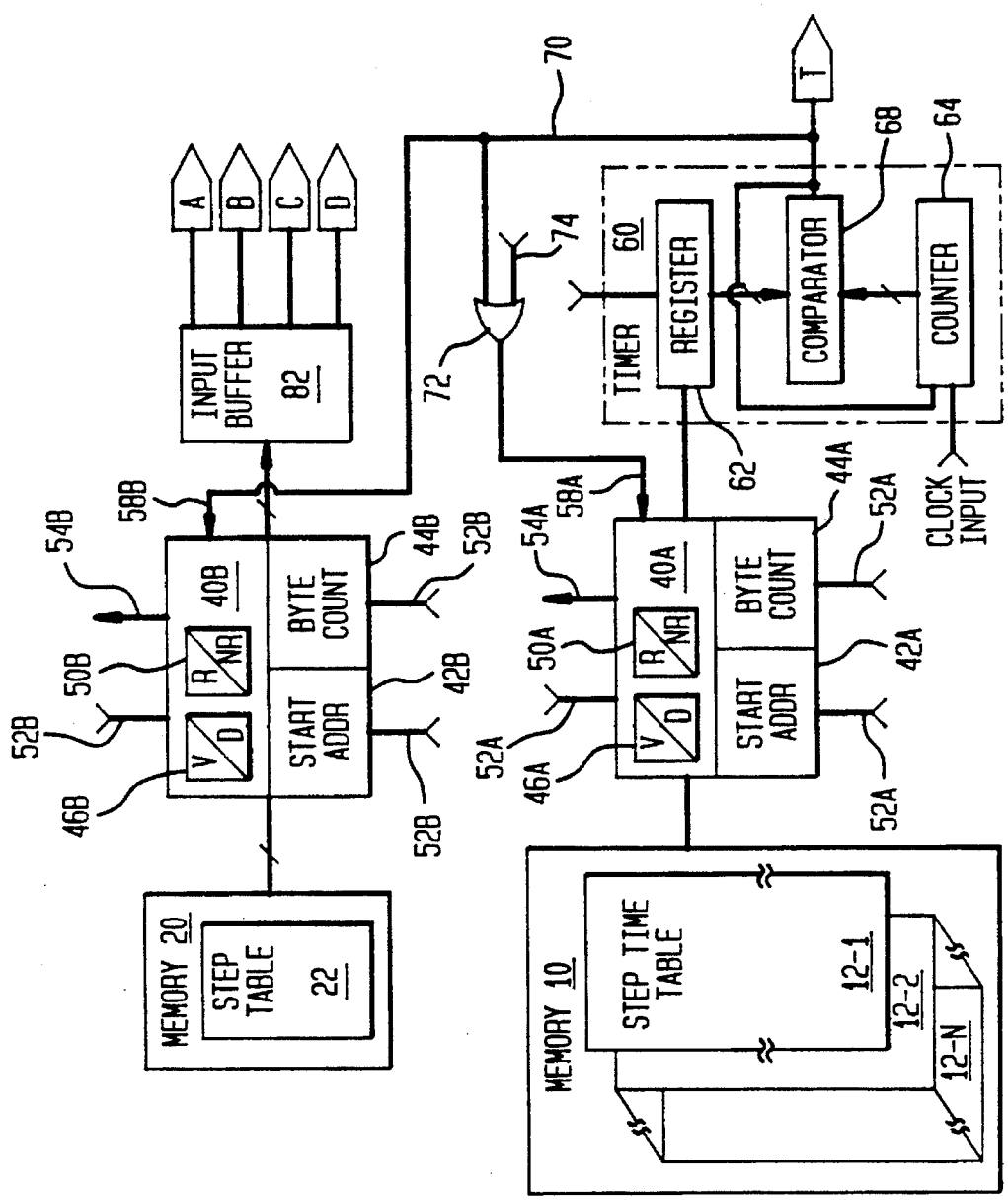
FIG. 1A and 1B shows a schematic block diagram of an apparatus in accordance with the subject invention.
Figure 1B:
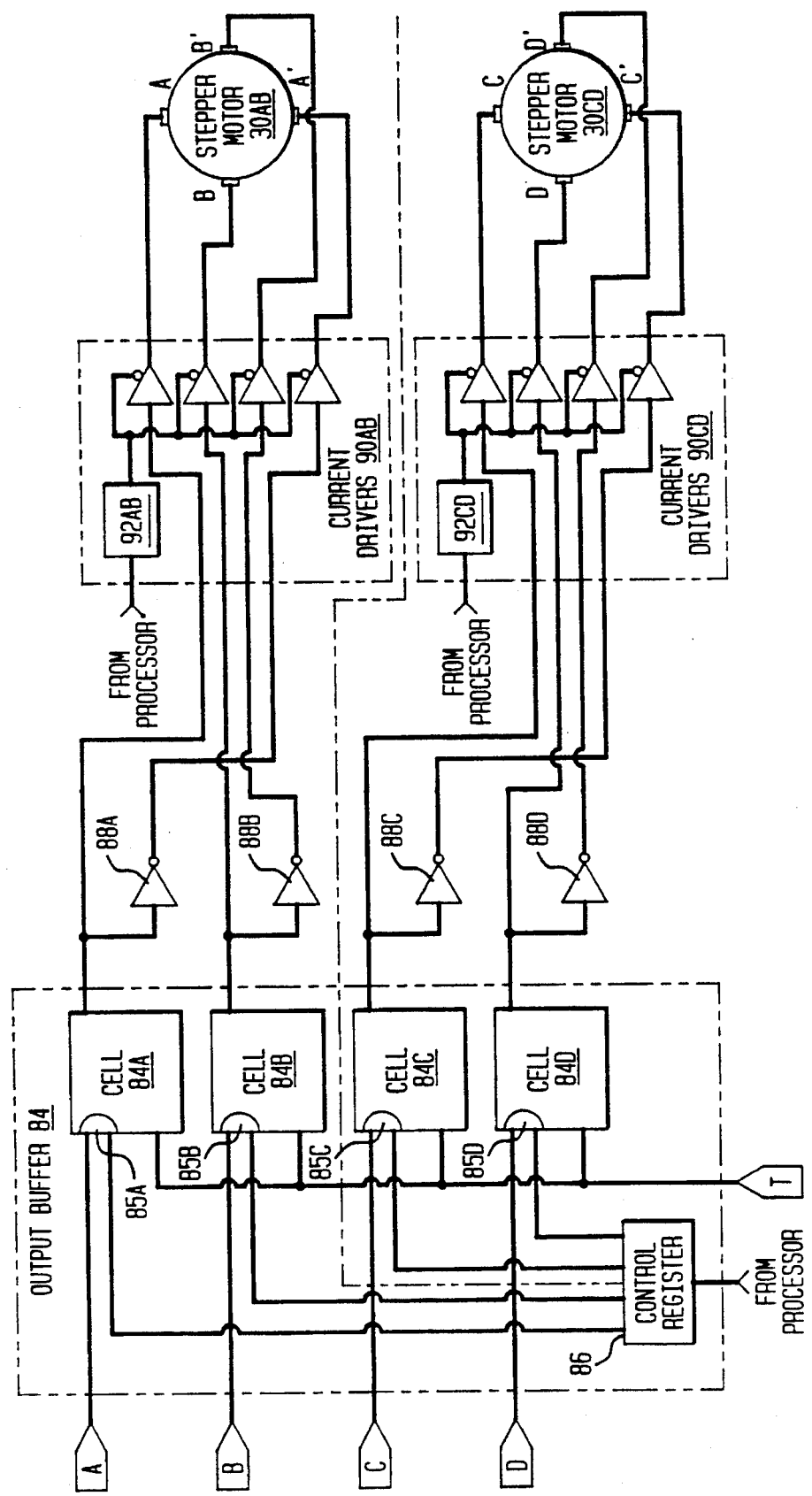

FIG. 1A and 1B show a block diagram of a preferred embodiment of the subject invention. In FIG. 1A memory 10 stores a plurality of step time tables 12-1 through 12-N.

Memory 20 stores step table 22. Step table 22 defines a full-step mode of operation for either stepper motor 30A or 30B as will be described further below. Identical DMA channels 40A and 40B are connected to memory 10 and memory 20 respectively to access selected step time tables and step table 22.

Each of channels 40A and 40B includes a start address register 42A, 42B a byte count register 44A, 44B and up/down flag 46A, 46B and a repeat/non-repeat flag 50A, 50B. Each of DMA channels 40A and 40B operates in a manner well known to those skilled in the art to transfer blocks of data from memory without the need for direct program control by a data processor. Once initialized and started DMA channels 40A and 40B will transfer a block of data beginning with the start address defined in registers 42A or 42B and continuing sequentially until the number of bytes defined in registers 44A or 44B is reached. Channels 40A and 40B also include an input from a data processor 52A and 52B for initializing the channels and outputs to the data processor 54A and 54B to signal the data processor when the block has been transferred. Depending upon the state of flags 46A and 46B channels 40A and 40B will either increment or decrement the address accessed. Depending upon the state of flags 50A and 50B channels 40A and 40B will either repeat output of the data block cyclically or will halt once the byte count in registers 44A or 44B is reached. Channels 40A and 40B also include next byte inputs 58A and 58B to initiate and continue operation.

Channel 40A loads the sequence of step times from the selected step time table, here shown as table 12-1 into register 62 of timer 60. When comparator 68 detects equality between register 62 and counter 64 timer 60 generates a trigger signal on line 70. Each time a trigger signal is generated counter 64 is reset and begins counting upwards driven by a system clock (not shown).

The trigger signals are fed back to DMA channel 40A through "or" gate 72 to cause channel 40A to access the next address in step time table 12-1 and load the next step time into register 62.

As can be seen channel 40A and timer 60 cooperate to generate a sequence of trigger signals which are separated by intervals of numbers of system clock pulses, by the sequence of step times in step time table 12.

To initiate execution of a step time table a data processor sends a signal on input 74 of gate 72 to channel 40A to transfer the first step time in the step time table.

Line 70 is also connected to input 58B of DMA channel 40B to initiate transfer of the next pair of exitation patterns in step table 22, and to input buffer 82. At the same time the trigger signals cause the previous contents of input buffer 82 to be transferred to output buffer 84 (shown in FIG. 1b) and applied to current drivers 90AB and 90CD.

Use of double buffers 82 and 84 assures that output buffer 84 will always be updated, and the exitation pattern applied to stepper motor 30AB or 30CD changed, synchronously with the trigger signals on line 70.

Input buffer 82 outputs 4 bits A, B, C, and D which represent successive steps in two identical (except for phase) exitation patterns output from step table 22. In FIG. 1B bytes A, B, C, and D are input to output buffer 84, each in corresponding cells 84A, 84B, 84C, and 84D through gated inputs 85A, 85B, 85C, and 85D when a trigger signal is generated by comparator 60. Gates 85A, 85B, 85C, and 85D are enabled by the contents of control register 86 which is loaded directly from the processor. As will be described further below the processor will load register 86 to enable either the pair of cells 84A and 84B to control stepper motor 30AB, or enable cells 84C and 84D to control stepper motor 30CD, while disabling the other group of cells.

(The control of motors 30AB and 30CD is identical and only the control of motor 30AB need be described further for an understanding of the invention.)

The outputs of cells 84A, and 84B are inverted by inverters 88A, and 88B to provide two bipolar signals connected to current drivers 90AB which drive stepper motor 30AB.

Preferably drivers 90AB and 90CD include latches 92AB and 92CD, which operates under the direct program control of a data processor, for disabling drivers 90AB and 90CD to turn motors 30AB and 30CD off.

Turning to FIG. 2, step table 22 contains a four byte patterns representing two full-step exitation patterns which differ only in phase. The sequence for bytes A and B is 0, 2, 3, 1, and for bytes C and D is 3, 1, 0, 2. As is well understood in the art this pattern will drive a stepper motor in full steps where the direction of the motor will be determined by the direction in which the sequence is output.

Depending upon whether control register stores pattern 102AB or 102CD bipolar outputs 104AB or 104CD will be output to control stepper motor 30AB or 30CD. Assuming that motor 30AB is chosen the output sequence 104AB will be applied to current drivers 90AB.

Since only two bits are used to define the output exitation patterns only a full-step mode of operation can be used with this embodiment of the subject invention since half-step and other modes of operation of a stepper motor require more than four exitation patterns.

The state of the unselected bytes C and D will remain constant holding motor 30CD in a fixed position. Alternatively, the processor may disable drivers 90CD through latch 92CD leaving motor 30CD free to rotate.

FIG. 3 shows a step time table consisting of a sequence of numerical values representative of the defined time between successive steps of motor 30. Note that step time zero must expire before the first exitation pattern is loaded into input stage 82 and step time 1 must expire before the first exitation pattern is loaded into output stage 84. This implies a minimum delay of approximately five microseconds. Of course it would be a simple matter to design the apparatus of FIG. 1 so that the step table was immediately accessed when the apparatus was started by the data processor but a five microsecond delay (at the preferred operating frequency of 40KHz) is acceptable in substantially all mechanical operations. The present design also allows incorporation of longer delays where desirable.

Thereafter channel 40A will sequentially access each step in the step time table until the last step is output. Because channel A is initialized for non-repetition it will then stop.

Those skilled in the art will recognize that is frequently desirable to continue to slew a stepper motor after it has been accelerated to a desired speed. This can be achieved by directly loading register 62 with a desired value to define the slew rate. (By "slew" herein is meant operation of a motor at a constant velocity for an indeterminate period.) Typically, the processor will then stop the motor by loading register 62 with a zero value which will halt timer 60. In a preferred embodiment of the subject invention register 62 may be designed to retain the last value in the step time table so that motor 30 will slew at the final non-zero step intervals of the step time table.

To initialize operation of the apparatus of FIG. 1 the data processor firsts sets flag 46A for either up or down access to the selected step time table. This value of flag 46A will typically remain unchanged since all step time tables are preferably to be read in the same direction. The data processor also sets flag 50A for non-repetitive operation; though repetitive access to a step time table for cyclic operation of a stepper motor is within the contemplation of the subject invention.

The data processor then initializes channel 40B with a starting address for step table 22 in register 42B, and a four byte count in register 44B, sets flag 50B for repetitive operation, and loads control register 86 to select either motor 30AB or 30CD.

To access a selected step time table the data processor then loads registers 42A and 44A with the appropriate starting address and byte count and sets flag 46B to appropriately determine the direction of rotation of motor 30. The data processor need then only apply the appropriate signal on input 74 to transfer the first step time in the step time table and initiate execution of the selected step time table in the manner described above.

Once operation of a selected motor is finished the other motor may be selected by reinitializing register 86.

In a preferred embodiment the DMA channels, timers, memory and buffers necessary to practice the subject invention are all integrated together with a processor, in a single integrated circuit intended for control applications, such as the commercially available H83000/3 microprocessor, and can be configured to implement an embodiment of the subject invention under software control.

The above descriptions have been provided by way of illustration only and numerous other embodiments of the subject invention will be apparent to those skilled in the art from consideration of the detailed description set forth above and the attached drawings. Particularly, larger ports outputting more bits can be used. For example an eight bit port could control four stepper motors or could output two bipolar exitation patterns without use of inverters to control two motors in more than one mode of operation, as described in the above referenced co-pending applications. Limitations on the scope of the subject invention are therefore to be found only in the claims set forth below.

What is claimed is:

1. An apparatus for control of a plurality of stepper motors by a data processor, said apparatus comprising:
   a) a first memory for storing a step time table comprising a sequence of step times defining a velocity profile for said stepper motors;
   b) a first DMA channel for sequentially accessing said first memory to output said sequence of step times;
   c) a timer for receiving said step times from said first DMA channel and for generating a sequence of trigger signals corresponding to expiration of each of said step times;
   d) a second memory for storing a step table defining a plurality of identical sequences of exitation patterns for driving said plurality of stepper motors;
   e) a second DMA channel for repetitively accessing said second memory to simultaneously and cyclically output said plurality of sequences of exitation patterns to drive a selected one of said stepper motors;
   f) a buffer comprising a plurality of groups of cells, each of said groups receiving and temporarily storing an exitation pattern for a corresponding one of said plurality of stepper motors;
   g) an enabling register for storing data for enabling one of said groups corresponding to said selected motor and disabling all others of said groups; wherein;
   h) said first DMA channel is responsive to said trigger signals to output said sequence of step times;
   I) said second DMA channel is responsive to said trigger signals to simultaneously and cyclically output said plurality of sequences of exitation patterns;
   j) said timer is responsive to input of said step times to begin timing the duration of said step times;
   k) said enabling register is responsive to said data processor to input said data, whereby said selected motor is enabled; and,
   l) said apparatus is responsive to said data processor to initiate execution of said velocity profile.

2. An apparatus as described in claim 1 wherein each of said groups consists of two cells, each of said cells generating an inverted and non-inverted output to drive a selected of one of said plurality of stepper motors.

3. An apparatus as described in claim 1 wherein said first memory stores a plurality of step time tables defining a corresponding plurality of velocity profiles and said first DMA channel is responsive to said data processor to select one of said step time tables.

4. An apparatus as described in claim 1 wherein said timer is directly connected to said data processor to receive additional step times directly from said data processor; whereby said stepper motor can be operated under direct program control by said data processor after execution of said velocity profile.

5. An apparatus as described in claim 1 wherein said timer retains a last value received from said first DMA channel after execution of said velocity profile and thereafter repetitively generates said trigger signals at constant intervals equal to said last step time; whereby said stepper motor slews out a constant final velocity determined by said velocity profile.

6. A apparatus as described in claim 1 wherein said second DMA channel is selectively initialized to either increment or decrement a current address when accessing said step tables; whereby said stepper motor is selectively driven in either a forward or reverse direction.

7. An apparatus as described in claim 1 wherein said buffer comprises an input stage and an output stage, said buffer responding to said trigger signals to transfer an exitation pattern from said input stage to said output stage; whereby said stepper motor is synchronized with said trigger signals.

8. An apparatus as described in claim 7 further comprising means for disabling drivers for said stepper motors, said means being responsive to said data processor fix enabling or disabling said drivers under direct program control.

9. A method of controlling a plurality of stepper motors comprising the steps of:
   a) storing a step time table comprising a sequence of step times defining a velocity profile in a first memory;
   b) storing a step table defining a plurality of identical sequences of exitation patterns for driving said plurality of stepper motors in a second memory, each of said motors corresponding to one of said sequences of exitation patterns;
   c) outputting a first step time from said step time table;
   d) timing the duration of each of said step times as it is output and generating a trigger signal corresponding to expiration of intervals defined by each of said step times;
   e) responding to said trigger signals to sequentially output a next of said step times from said step time table, and to cyclically output a next of said exitation patterns in each of said plurality of sequences of exitation patterns from said step table;

f) selecting one of said plurality of sequences of exitation patterns to drive a corresponding one of said motors and deselecting all other of said sequences of exitation patterns.

10. A method as described in claim 9 comprising the further steps of:

a) storing at least one additional step time table to form a plurality of step time tables; and b) selecting one of said plurality of step time tables and outputting said first step time and said next step time from said selected table.

11. A method as described in claim 9 comprising the further steps of, after completion of said velocity profile:

a) halting output of said step timer;

b) continuing to output said trigger signals at constant intervals approximately equal to a last step time of said acceleration profile;

c) continuing to respond to said trigger signals to output said exitation pattern; whereby said stepper motor slew's at a constant rate.

12. A method as described in claim 9 comprising the further step of selecting a direction in which to access said selected step table, whereby said stepper motor is selectively driven in either a forward or reverse direction.

13. A method as described in claim 9 wherein said exitation patterns are output to said stepper motor synchronously with said trigger signals.

* * * * *